(12) United States Patent
Anderson et al.

(10) Patent No.: US 6,700,612 B1
(45) Date of Patent: Mar. 2, 2004

(54) REVIEWING AND NAVIGATING AMONG IMAGES ON AN IMAGE CAPTURE UNIT USING A THUMBNAIL POSITION MEMORY BAR

(75) Inventors: Eric C. Anderson, San Jose, CA (US); John F. Pavley, Cupertino, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/535,144

(22) Filed: Mar. 24, 2000

Related U.S. Application Data

(63) Continuation-in-part of application No. 08/708,370, filed on Sep. 4, 1996, now Pat. No. 6,097,431.

(51) Int. Cl.$^7$ .............................................. H04N 5/222
(52) U.S. Cl. .............................. 348/333.11; 348/333.05
(58) Field of Search ........................ 340/207.99, 231.99, 340/231.3, 333.01, 333.02, 333.05, 333.11, 333.12; 345/668, 667; 386/107, 117

(56) References Cited

U.S. PATENT DOCUMENTS

| | | | |
|---|---|---|---|
| 6,097,431 A | * 8/2000 | Anderson et al. | 348/231.7 |
| 6,249,316 B1 | * 6/2001 | Anderson | 348/333.05 |
| 6,310,648 B1 | * 10/2001 | Miller et al. | 348/333.05 |
| 6,400,375 B1 | * 6/2002 | Okudaira | 345/668 |
| 6,515,704 B1 | * 2/2003 | Sato | 348/333.11 |

* cited by examiner

*Primary Examiner*—Tuan Ho
(74) *Attorney, Agent, or Firm*—Sawyer Law Group LLP

(57) ABSTRACT

A method for reviewing and navigating among stored images on an image capture unit having a display, wherein each of the stored images is represented by a thumbnail image is disclosed. The method begins by displaying a page of thumbnail images on a display in which when the page is full of thumbnails, the thumbnails are arranged in an N×M array. A memory bar is displayed adjacent to the page on the display, wherein the memory bar indicates a position of the displayed page in relation to the other pages of stored images. The user may navigate among the thumbnail images in the displayed page via the up, down, right and left buttons, where a highlight area indicates a location of a currently selected thumbnail. The user may also navigate from the displayed page to other pages via up, down, right and left buttons, wherein the displayed page is replaced with a second page. In response, the memory bar is updated to indicate a position of the second page in relation to the other pages.

35 Claims, 18 Drawing Sheets

REVIEWING AND NAVIGATING AMONG IMAGES ON AN IMAGE CAPTURE UNIT USING A THUMBNAIL POSITION MEMORY BAR

CROSS-REFERENCE TO RELATED APPLICATIONS

This application is a Continuation-in-Part of application Ser. No. 08/708,370 entitled "A Method And System For Reviewing And Navigating Among Images In An Image Capture Unit" filed on Sep. 4, 1996 now U.S. Pat. No. 6,097,431.

FIELD OF THE INVENTION

The present invention relates generally to displaying digital images and more particularly to reviewing and navigating among images using a thumbnail position memory bar.

BACKGROUND OF THE INVENTION

Digital cameras are utilized for taking pictures of scenes and the like. Some digital cameras include a display screen to display images after the picture has been taken. Digital cameras which include a display screen oftentimes have the ability to display captured images in different display formats. For example, a digital camera may display a format of one image, a format of four images, and a format of nine images at the same time. Each of the display formats includes a plurality of pages where a page is the number of images on a display at one time (in this case 1, 4 or 9 images). In such a camera there is also the ability to navigate from one image or thumbnail to another or from one page of images of the display format to another page of images within that display format. There is oftentimes the ability in such digital cameras to move between display formats via a mode button. What is meant by this, for example, is that it is possible through such a mode button to move between a display format of a single image to a display format of four images to a display format of nine images. With conventional digital cameras, reviewing and navigating within a plurality of images via a particular display format (i.e. 1, 4 and 9) often has its disadvantages.

One disadvantage is that navigating between images and between the pages of images in conventional digital cameras via the mode button is complex and unnatural. In some situations, these types of cameras also require the input of a large number of keystrokes in order to view a selected image.

To more particularly describe some of the problems with previous displays in digital cameras, such as the display in a Casio QV10 camera, refer now to the following discussion in conjunction with FIG. 1. FIG. 1 shows a conventional digital camera display which includes a zoom button 3, a display button 5, a mode button 7, and a forward-reverse button 9. In such a camera the display button 5 allows one to switch between page and image mode to look at a particular image (Image A). The zoom button 3 allows one to proceed from a small image to a full size of a selected image, the mode button allows one to select different display formats and the forward-reverse button 9 allows one to go from one image to an earlier image or a later image or earlier or later page.

FIG. 2 shows, the interaction between the different buttons to allow for the display of images in different formats. Initially, if in the display format one mode or one image per display, the forward and reverse button would allow one to go forward one image or back one image (block 11). If the mode button is pressed one time, then, for example, four images, A, B, C and D are each displayed (block 13). The forward and reverse buttons now provide for one page of four forward, one page of four back. If the mode button is pressed again, nine images are displayed (block 15) (A, B, C, D, E, F, G, H, I). The forward and reverse buttons now provide for one page of nine forward, one page of nine back. To go back to the first mode, the zoom button would be pressed to go back to image A as shown in block 23 only if the display button is pressed first. Otherwise the mode button is pressed. If the display of a particular image is desired, the display button would be pressed. Initially, an indication of a selected image is provided via underlining shown in blocks 13 and 17 (in this case A). The forward-reverse buttons are used to proceed to the next image within the display format highlighted by the underline. If, for example, a user wanted to display a selected image from the nine mode, then the zoom button would be pressed and the single image would be displayed.

However, as is seen, there is a complex interaction of zoom, display mode and forward-reverse to provide the appropriate images. This approach is not natural and requires many keystrokes in certain applications.

To more clearly illustrate this, referring now to FIG. 3A, what is shown is the selection of a fourteenth image from an image capture unit using the elements as described above. First, if the mode button would be pressed twice, as shown, to proceed to the mode where there are nine images being displayed at one time. Then the forward button is pressed to proceed to the next page. Then the display must be pressed. Then the forward button is then pressed four times to select the fourteenth image. Finally, the zoom button is pressed so that the desired image is now displayed. As is seen, this process requires nine keystrokes.

FIG. 3B shows the selection of the twenty-sixth image of the display proceeding from the fourteenth image. To select the twenty-sixth image, first the mode button must be pressed to return to the four mode. As is seen, image (N) 14 is now in a first position in top row rather than its original middle position of the second row. The mode button is then pressed again. Next, the plus button is pressed to proceed to the page that has the twenty-sixth (Z) image. The display button is pressed to underline the first image of the page (image twenty-three). The plus button is then pressed three additional times to select the twenty-sixth image. Thereafter, the zoom button is pressed to display the image. As is seen, eight additional keystrokes are required to proceed to display the twenty-sixth image. This can become time consuming and tedious for a user of the image capture device. In addition the process for obtaining a particular image is not a natural one and requires learning a particular protocol.

Accordingly, the conventional systems not only require more keystrokes, they are also less natural because different buttons have different functions dependent upon where a user is within the process.

Another problem with conventional digital cameras is that although the user may choose a particular display format for image review and navigation, the user is not provided with any feedback as to the location of a currently displayed page in relation to other pages during navigation. For example, assume that the user wishes to find a particular image but cannot remember if the image is located near the front or the back of all the images stored on the camera. Given a displayed page, the user would have no clue as to which direction to scroll in order to find the desired image. The user would therefore be forced to take a best guess at which direction to scroll, which could waste a considerable amount of time in the case where there are hundreds of images stored on the camera. One possible solution to this problem is to provide the digital camera with a memory bar 276.

FIG. 4 is a block diagram of a conventional digital camera memory bar 50, which is displayed while the user navigates among images 60 in the digital camera. The length of the memory bar 50 typically represents the total memory capacity of the digital camera. A shaded area 52 within the memory bar 50 typically represents the total number of stored images in the camera in relation to the total memory capacity. As the user scrolls through the images 60, a needle 54 slides along the shaded area 52 of the memory bar 50 to show the approximate location of the displayed images in relation to the total number of images stored in the camera.

Although displaying the memory bar 50 provides the user with some image location feedback, the memory bar 50 has drawbacks. One drawback is that the memory bar 50 is only capable of providing a vague, inaccurate indication of image location. As the number of stored images increases, the less the needle 54 will move across the display, further reducing the effectiveness of the memory bar 50 as a location indication. Another drawback is that the memory bar 50 may be marginally effective at providing location feedback when scrolling through individual images, as shown, but the memory bar 50 is ill suited for providing feedback for page navigation. Unfortunately, when large numbers of images are present on the camera, page navigation is the method of choice to speed review and navigation of the images.

Accordingly, there is a need for an improved method of displaying images on portable imaging devices, such as digital cameras, that allows a user to expeditiously review stored images in differently display formats, while at the same time provide an accurate indication of both image location and page location in a straightforward manner. For example, after taking several pictures it would be useful to identify a particular picture quickly and with the minimum of effort. It is also important to provide a more efficient way to quickly navigate through pages of images and to tell the location of a current image on a displayed page and the location of the page in relation to other pages in the camera. The system should be implementable in a simple and cost effective fashion and should be easily handled by a user. The present invention addresses such a need.

SUMMARY OF THE INVENTION

The present invention provides a method for reviewing and navigating among stored images on an image capture unit having a display, wherein each of the stored images is represented by a thumbnail image. The method begins by displaying a page of thumbnail images on a display in which when the page is full of thumbnails, all the thumbnails are arranged in an N×M array. A memory bar is displayed adjacent to the page on the display, wherein the memory bar indicates a position of the displayed page in relation to the other pages of stored images. The user may navigate among the thumbnail images in the displayed page via the up, down, right and left buttons, where a highlight area indicates a location of a currently selected thumbnail. The user may also navigate from the displayed page to other pages via up, down, right and left buttons, wherein the displayed page is replaced with a second page. In response, the memory bar is updated to indicate a position of the second page in relation to the other pages.

According to the present invention, the user is provided with the ability to navigate through a number of pages within a display format in a quick and intuitive manner, while at the same time know the exact thumbnail location as well as the page location in relation to other pages.

DESCRIPTION OF THE INVENTION

The present invention relates to a method and system for reviewing and navigating among images in a portal digital imaging device. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any portable or handheld digital imaging capture device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
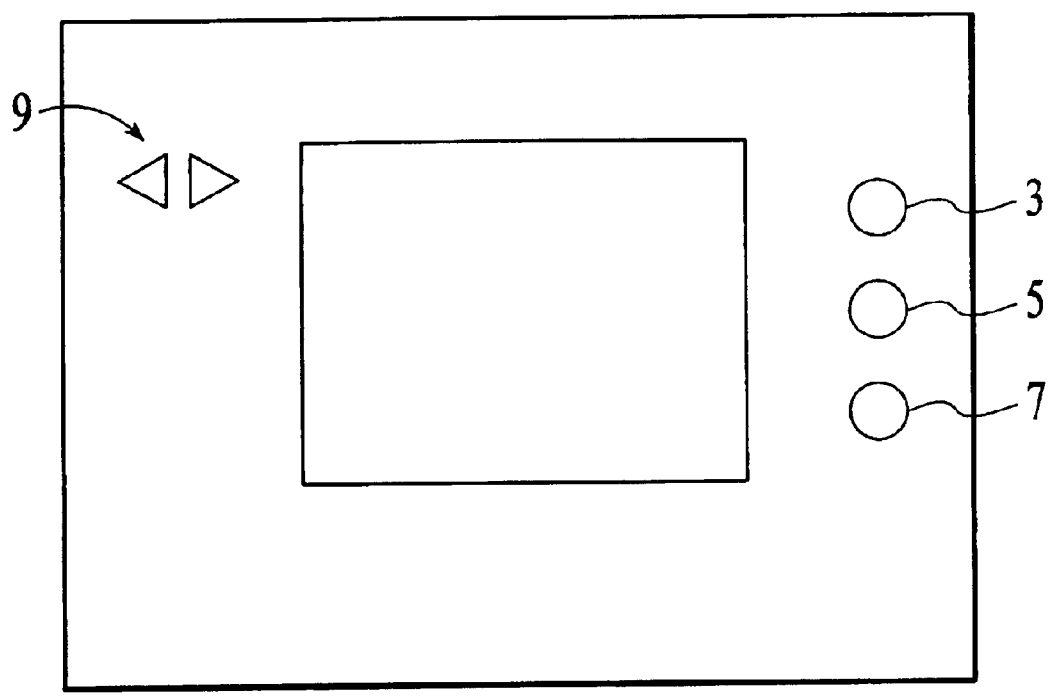
FIG. 1 is a diagram of a conventional digital camera.
Figure 2:
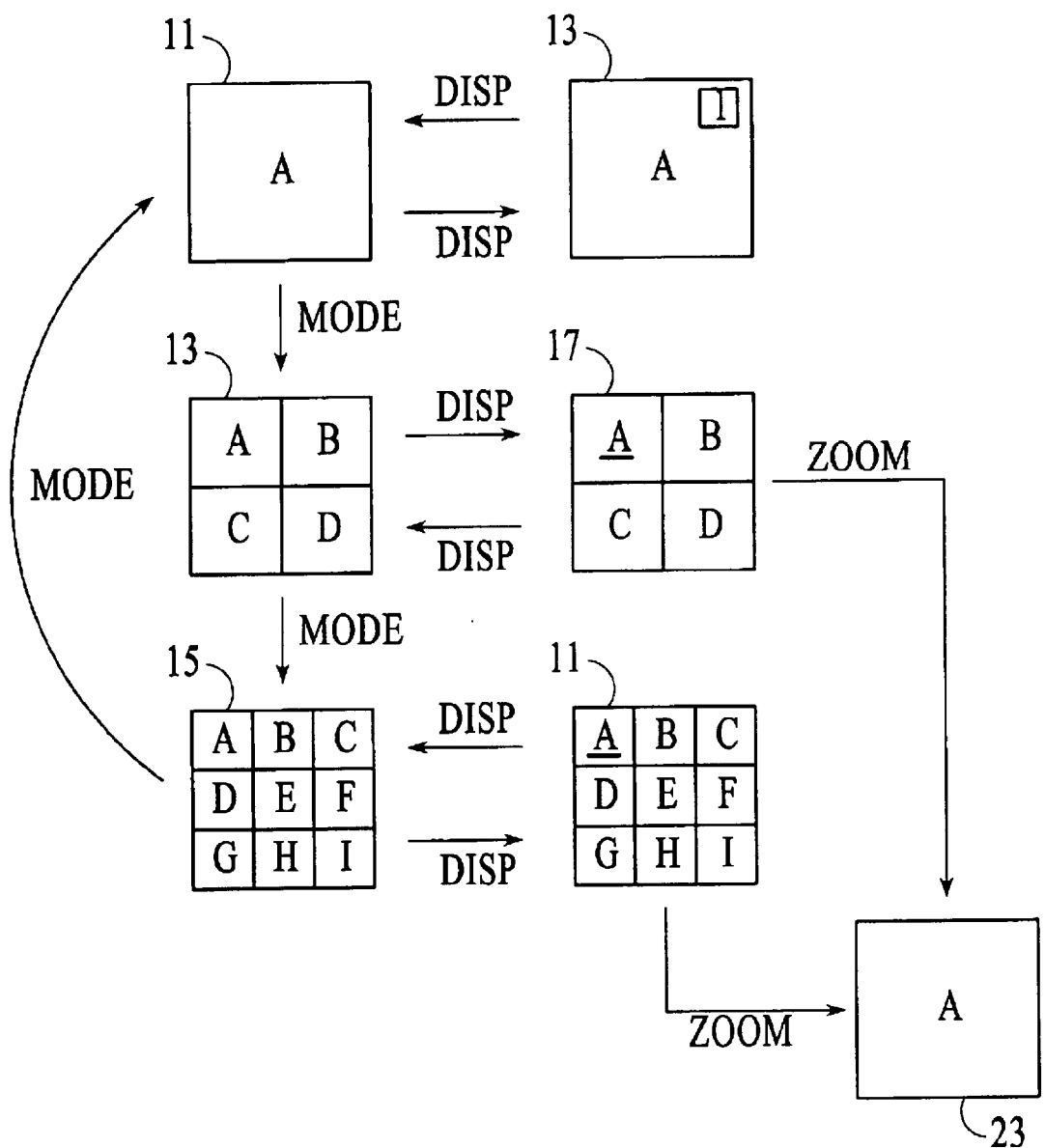
FIG. 2 is a diagram that shows the interaction between the buttons in the digital camera.
Figure 3A:
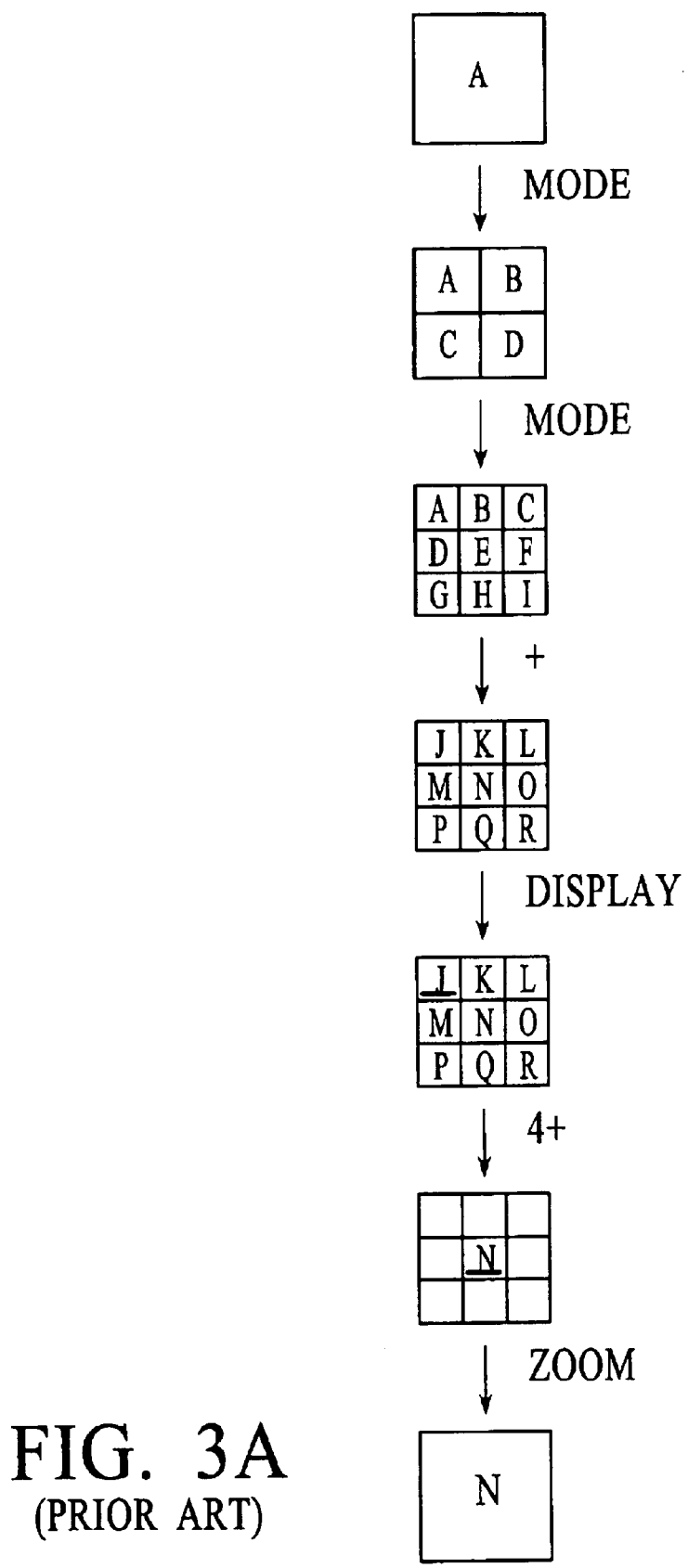
FIG. 3A shows the process of the selection of a fourteenth image using the digital camera of FIG. 1.
Figure 3B:
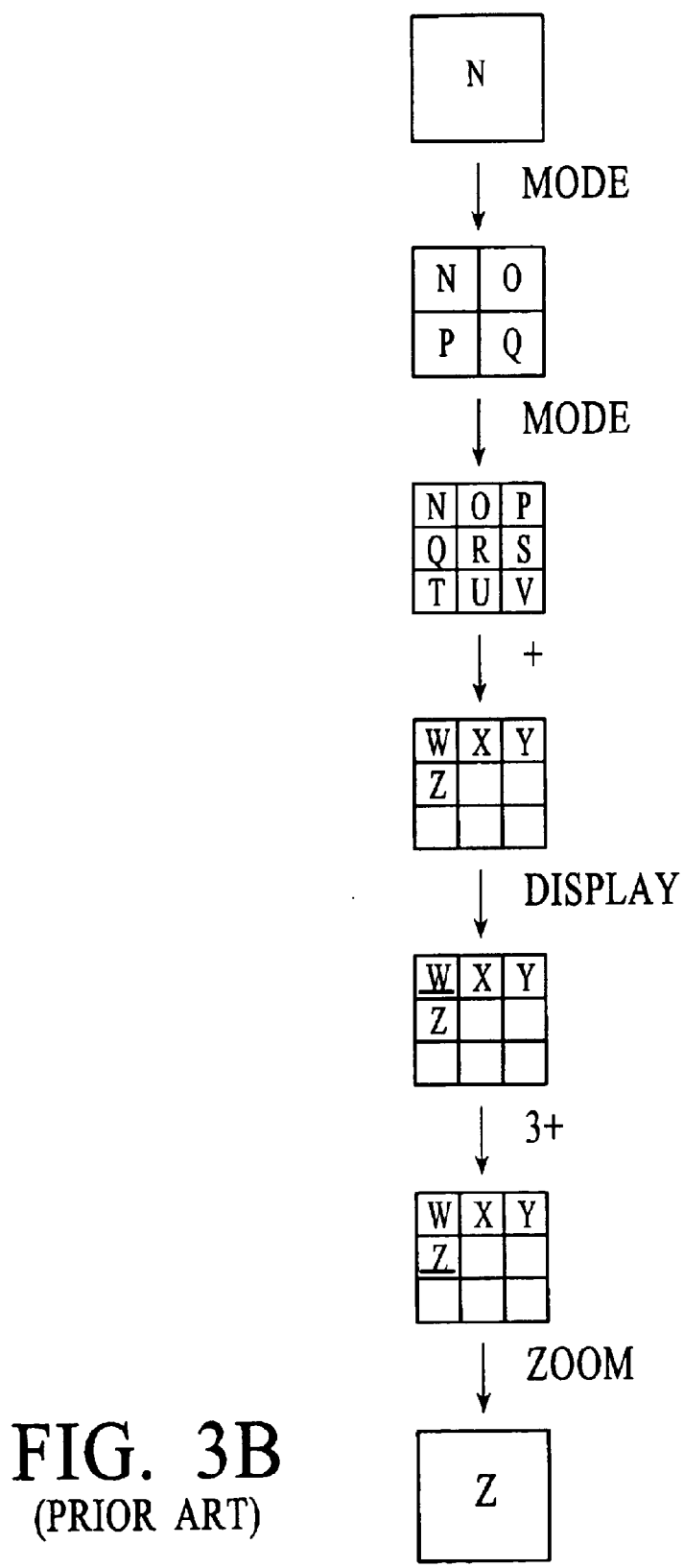
FIG. 3B shows the process of selection of the twenty-sixth image using the digital camera of FIG. 1.
Figure 4:
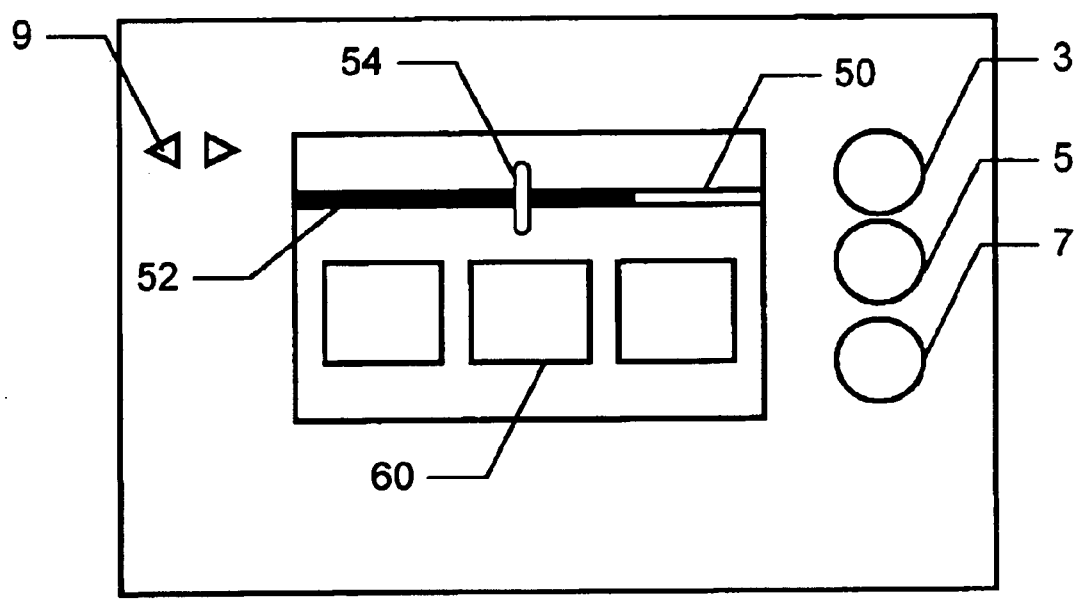
FIG. 4 is a block diagram of a conventional digital camera memory bar, which is displayed while the user navigates among images in the digital camera.
Figure 5:
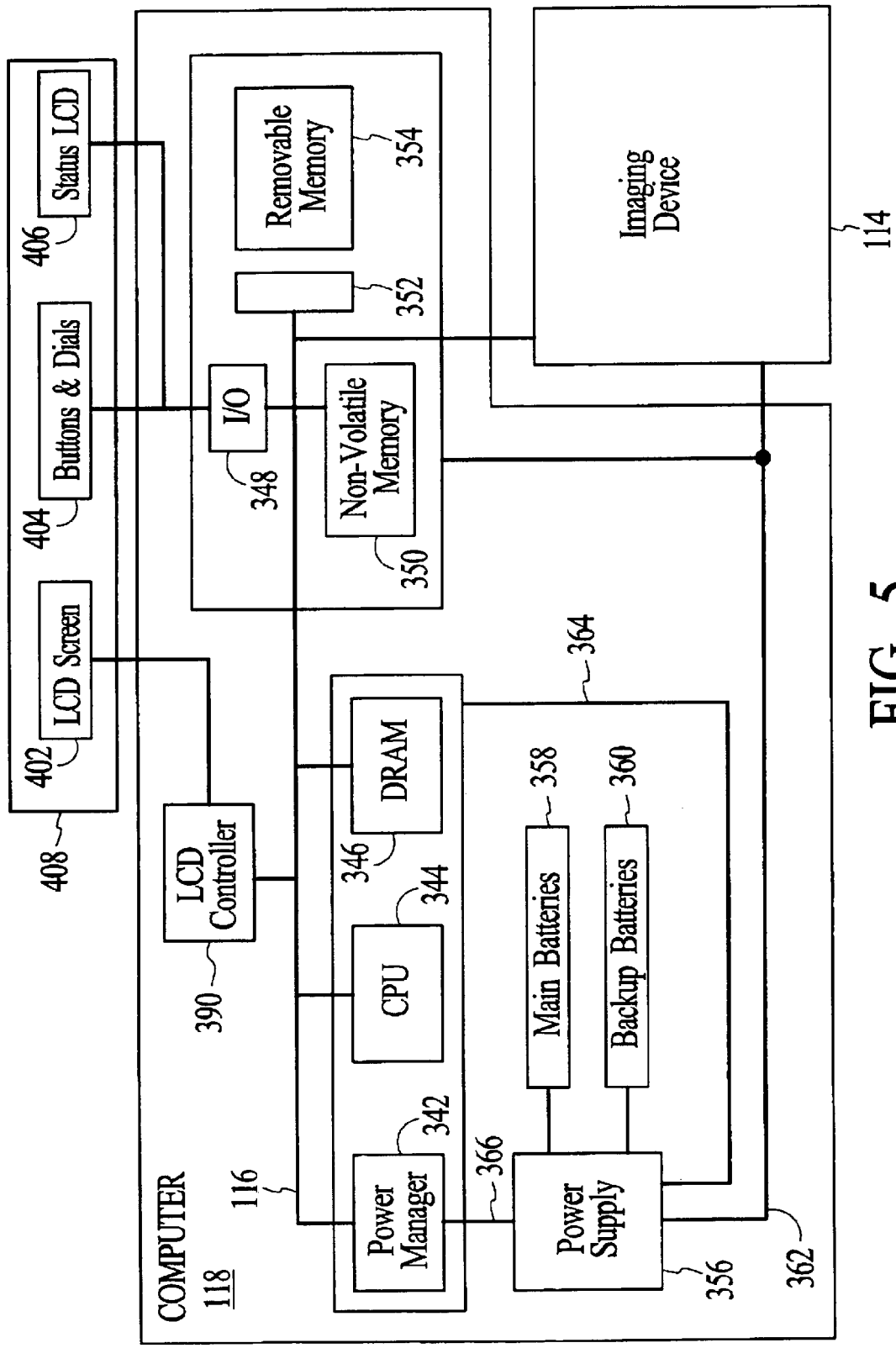
FIG. 5 is a block diagram showing one preferred embodiment of a digital camera for use in accordance with the present invention.

Referring now to FIG. 5, a block diagram of one preferred embodiment of a digital camera 110 is shown for use in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 244 runs an operating system that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSP's (digital signal processor) or ASIC's (Application Specific Integrated Circuit) could also be used.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 402 for display.

Figure 6A:
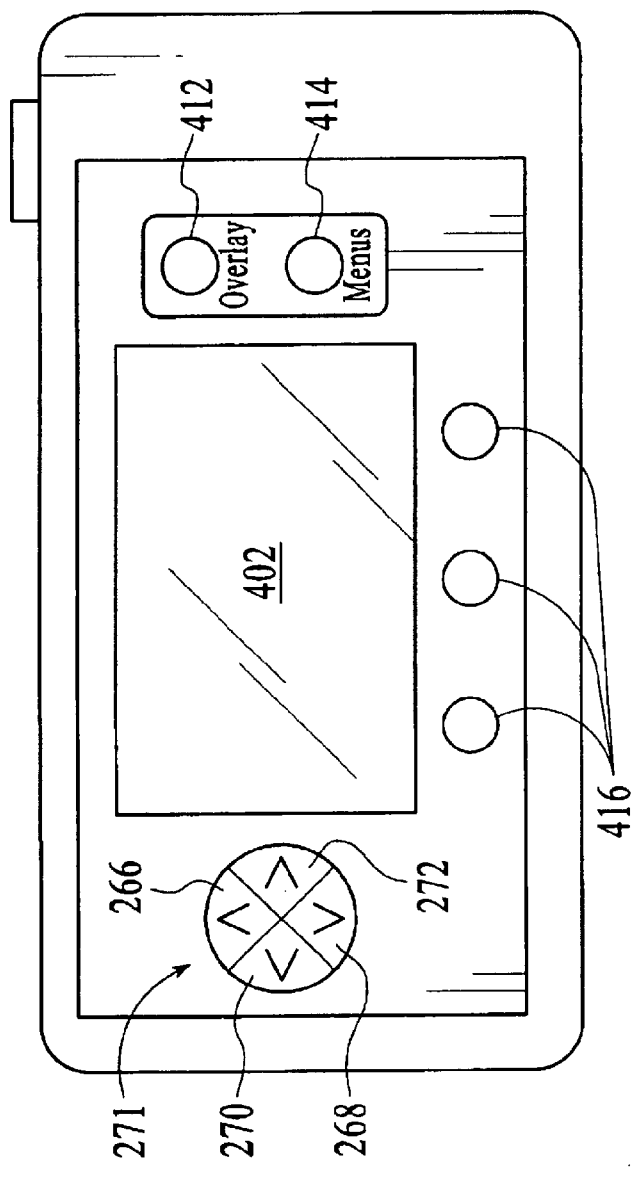
FIGS. 6A and 6B are diagrams depicting exemplary hardware components of the camera's user interface.
Figure 6B:
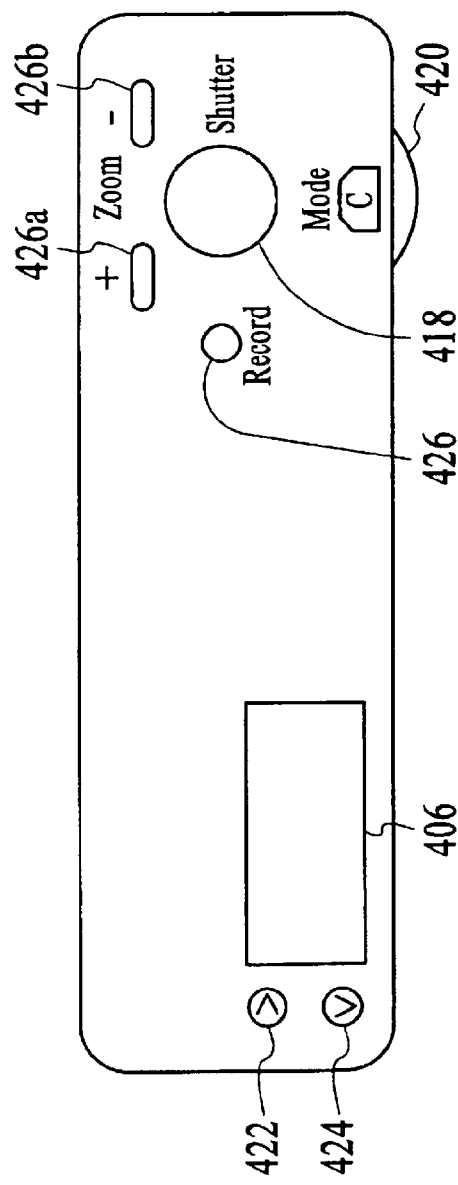

FIGS. 6A and 6B are diagrams depicting exemplary hardware components of the camera's user interface 408. FIG. 6A is back view of the camera 110 showing the LCD screen 402, a four-way navigation control button 271, which includes an up button 266, down button 268, left button 270, and right button 272, an overlay button 412, a menu button 414, and a set of programmable soft keys 416. FIG. 6B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

In a preferred embodiment, the camera operates in at least three modes, a capture mode for capturing images, a play mode and a review mode. The user preferably switches between the capture, play, and review modes, using the mode dial 420. In capture mode, the camera 100 supports the actions of preparing to capture an image, and capturing an image through the use of either the LCD screen 402 alone or the status LCD 406 with the aid of an optional optical viewfinder (not shown). In play mode, the LCD screen 402 displays a single, screen-sized image at a time in the orientation that the image was captured. The user may also play any recorded sound associated with a displayed image or to to play back sequential groupings of images, which may comprise timelapse, slide show, and burst image images. Review mode displays multiple thumbnail images at a time to allow the user to quickly review all the images stored in the camera 100. The user may also edit and sort selected images, or print and transfer the images.

Figure 7A:
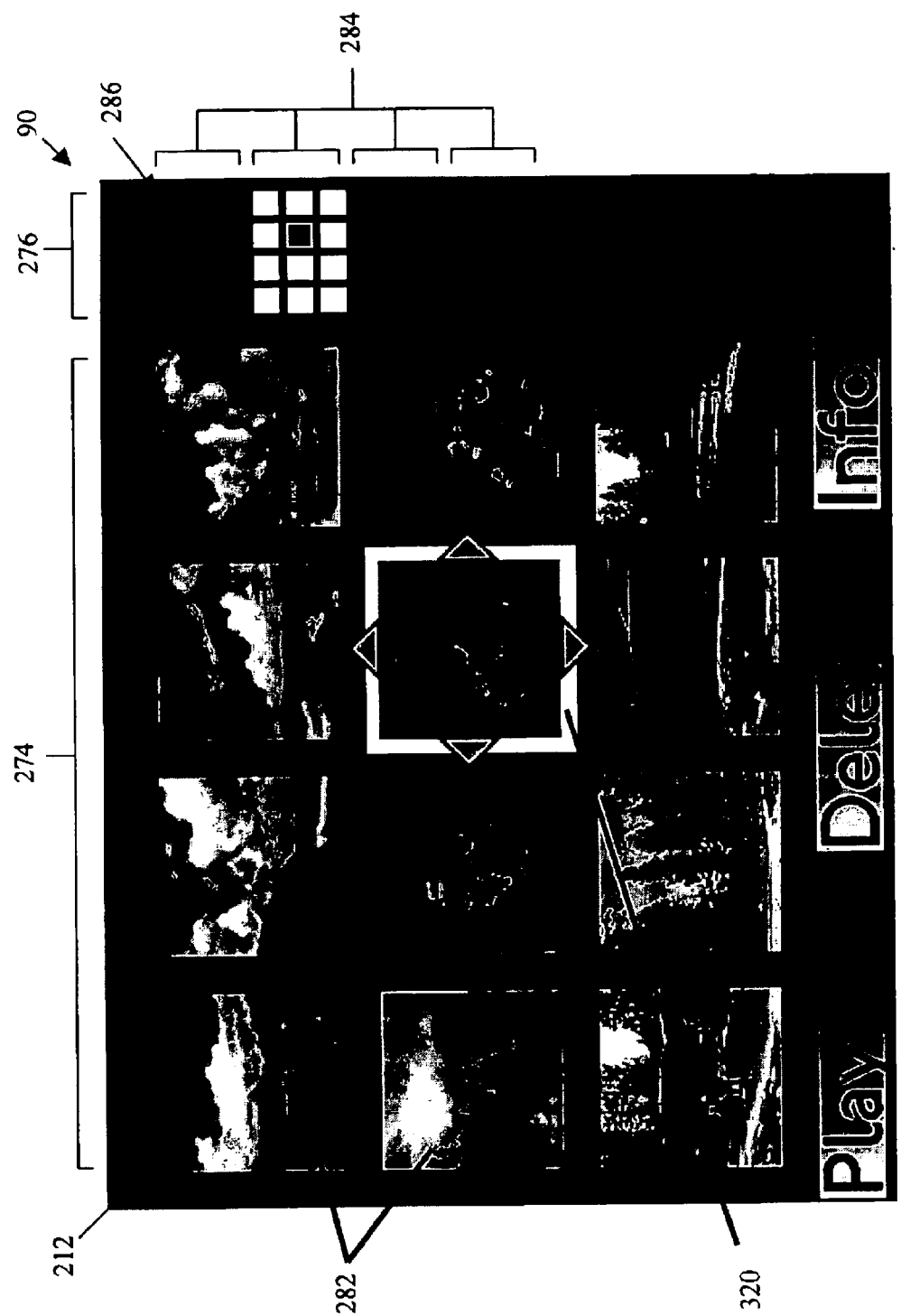
FIGS. 7A–7C are block diagrams illustrating a review mode screen in accordance with the present invention.
Figure 7B:
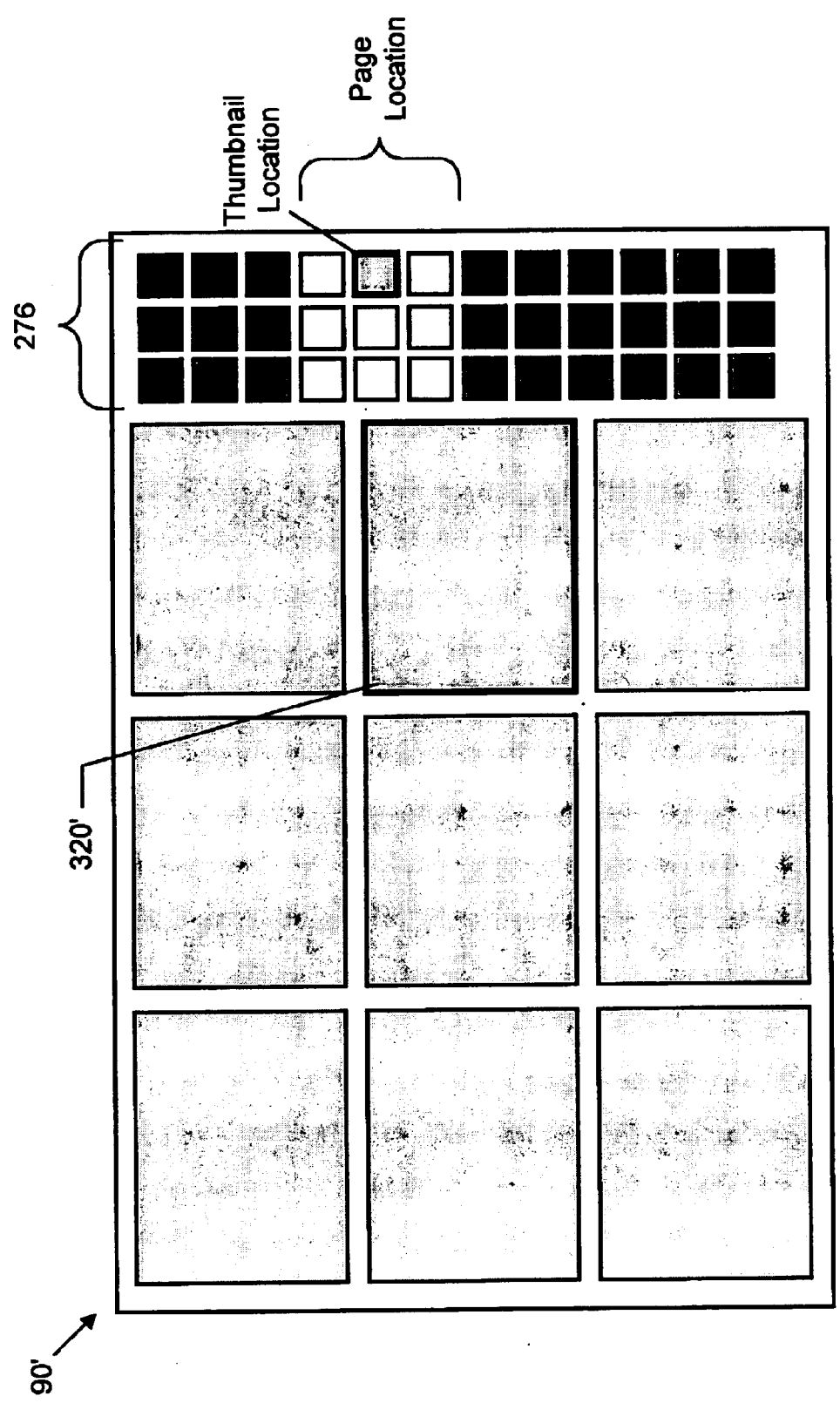
Figure 7C:
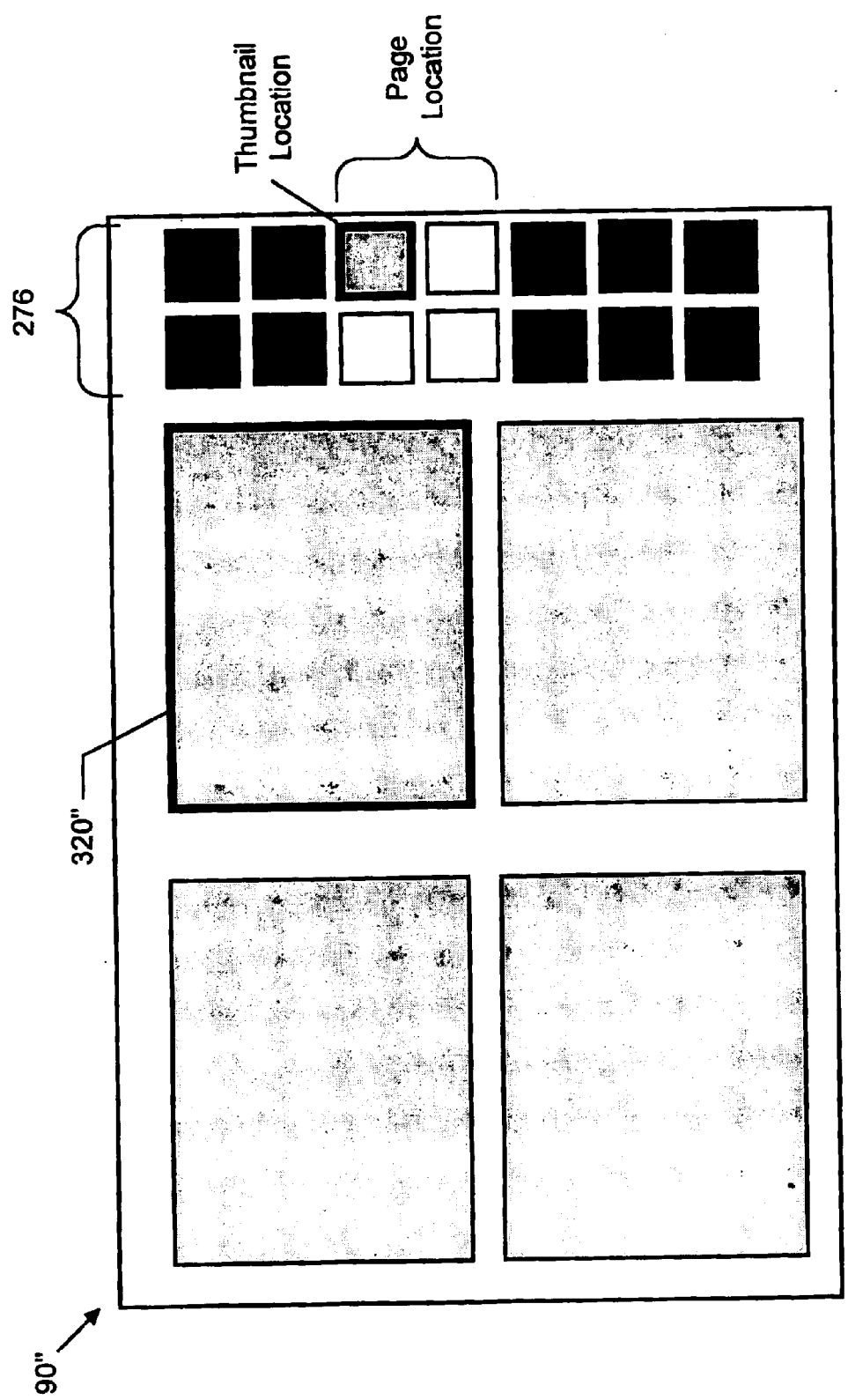

FIGS. 7A–7C are block diagrams illustrating a review mode screen in accordance with the present invention. The review mode screen includes a main display area 274 and a thumbnail position memory bar 276. The main display area 274 is for displaying images one page of thumbnail images 282 at a time in one of several two-dimensional display formats. In each of the two-dimensional display formats, a full page includes thumbnail images 282 arranged in an N×M array.

FIG. 7A shows that in a preferred embodiment, when the review mode is initially invoked, a display format 90 is shown which displays page of twelve images 282 in a 4×3 array. The user can navigate among the series of thumbnail images 282 on a displayed page to select a particular thumbnail 282 using the four-way navigation button 271. Referring now to FIGS. 7B and 7C, what is shown are display formats 90' and 90" that provide a page of nine and four images displayed on the screen, respectively. When display format 90 is displayed (FIG. 7A), pressing the view button 262 causes a page of nine images to be displayed in a 3×3 array, as shown in FIG. 7B. Pressing the view button 262 a second time causes a page of four images to be displayed on the LCD screen 280 in a 2×2 array, as shown FIG. 7C. As used herein, displaying a page of twelve thumbnail images 282 in a 4-by-3 array is referred to as known as a 12-up display, displaying a page of nine thumbnail images 282 in a 3-by-3 array is referred to as known as a 9-up display, and displaying a page of four thumbnail images 282 in a 2-by-2 array is referred to as known as a 4-up display. It should be understood, however, that the review mode could be provided with any number of two-dimensional display formats and such use would be within the spirit and scope of the present invention.

The position of the currently selected thumbnail within the displayed page is indicated by a highlight area, indicated by 320, 320' and 320", respectively. This highlighting is controlled by the up, down, right and left buttons 266–272 (FIG. 5) to select the proper image. The highlight area 320 is shown as a rectangle for allowing for quick and easy identification of the image selected, but could be oval, circular, a cursor or any other shape.

According to the present invention, the thumbnail memory bar 276 is displayed adjacent to an edge of the LCD screen to indicate the position of the page currently displayed in the main display area 274 in relation to all the pages stored in the digital camera. The memory bar 276 further indicates the current thumbnail position within the displayed page. According to the present invention, these functions are accomplished by displaying a series of mini-pages 284. Each mini-page 284 comprises an N×M array of graphical elements. 286 representing the locations of thumbnail images 282 on the corresponding full-sized page. As the user navigates from page to page in the main display 274, the position of the currently displayed page among all of the pages is indicated by highlighting the corresponding mini-page 284 in the memory bar 276. And as the user navigates among the thumbnail images 282 on a displayed page in the main display 274, the corresponding elements 286 in the corresponding mini-page 284 are also highlighted. In a preferred embodiment, the element 286 representing the position of the current thumbnail is highlighted in a manner different than that of the current mini-page 284. For example, the current mini-page 284 may be displayed in white, while the element 286 representing the position of the current thumbnail may be displayed in gray.

As the user navigates within a displayed page, and from page to page, the memory bar 276 is updated accordingly. If the total number of image pages stored in the camera exceeds the available memory bar display space, the memory bar may page up or down in response to the user navigating to a page not currently shown on the memory bar 276. In addition, an indication may be given showing the relative locations of the pages currently shown on the memory bar 276 in relation to the total number of pages. This may be implemented with text or graphics. For example, the pages in memory could be enumerated and text could be shown on the display indicating that pages 8–11 are represented in the memory bar 276 out of a total of 49 pages. Graphically, a scroll column could be displayed adjacent to the memory bar 276 showing the current location of the currently displayed pages in relation to the total number of pages.

Unlike conventional memory bars 276, the thumbnail memory bar 276 of the present invention provides information as to the location a current image down to the thumbnail level. This provides the user with a much more precise and informative location information. In addition, the thumbnail memory bar 276 also provides location information at the page level, no matter what display format is chosen.

Figure 8:
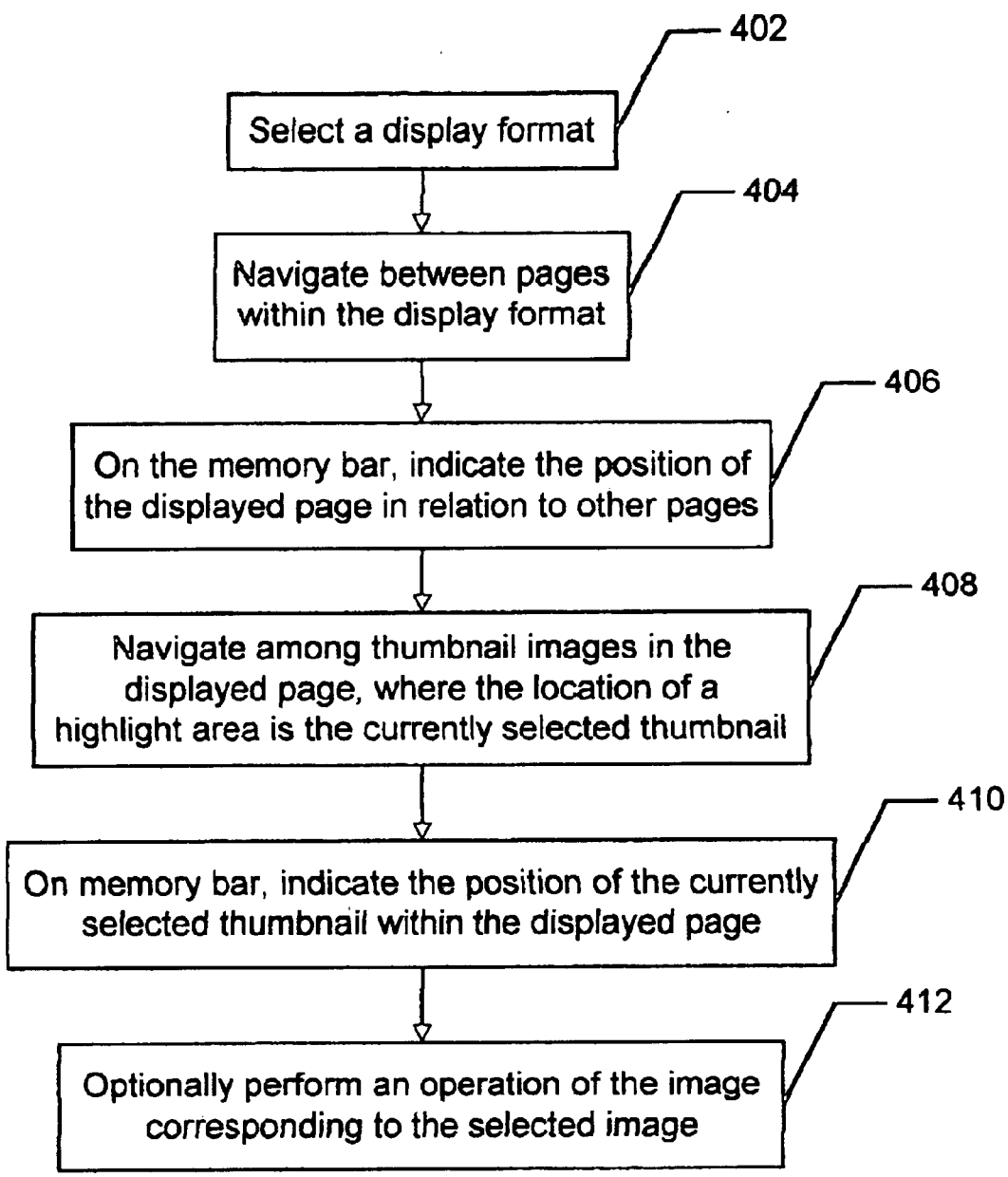
FIG. 8 is a flow chart illustrating the operation of a reviewing and navigating process in accordance with the present invention.

To more specifically understand the operation of this feature of the present invention, refer now to FIG. 8, which is a flow chart of the operation of reviewing and navigating process in accordance with the present invention. The process begins by selecting a display format, via step 402. Preferably, upon initialization of review mode the default display format is a 12-up display, but may be changed via the view button 262. After a page is displayed, it is possible to navigate between the pages within the display format via the up, down, right and left buttons, via step 404. During page navigation, the memory bar 276 indicates the position of the displayed page in relation to other pages via step 408. In the displayed page, the user may also navigate among the thumbnail images 282 in the page, via the up, down, right or left button, where the location of the highlight area indicates the currently selected thumbnail via step 410. During image navigation, the memory bar 276 also indicates the position of the currently selected thumbnail on the currently displayed page via step 412. After an image has been selected, any number of operations may optionally be performed on the image corresponding to the selected thumbnail via step 414, such as playing the image, marking the image, deleting the image, editing the image, and displaying information about the image, for instance.

Navigation Control

An important feature of the present invention is the ability to navigate through a number of pages within a display format via step 406, while at the same time the thumbnail memory bar 276 is updated to show the exact thumbnail and page location in memory.

Figure 9:
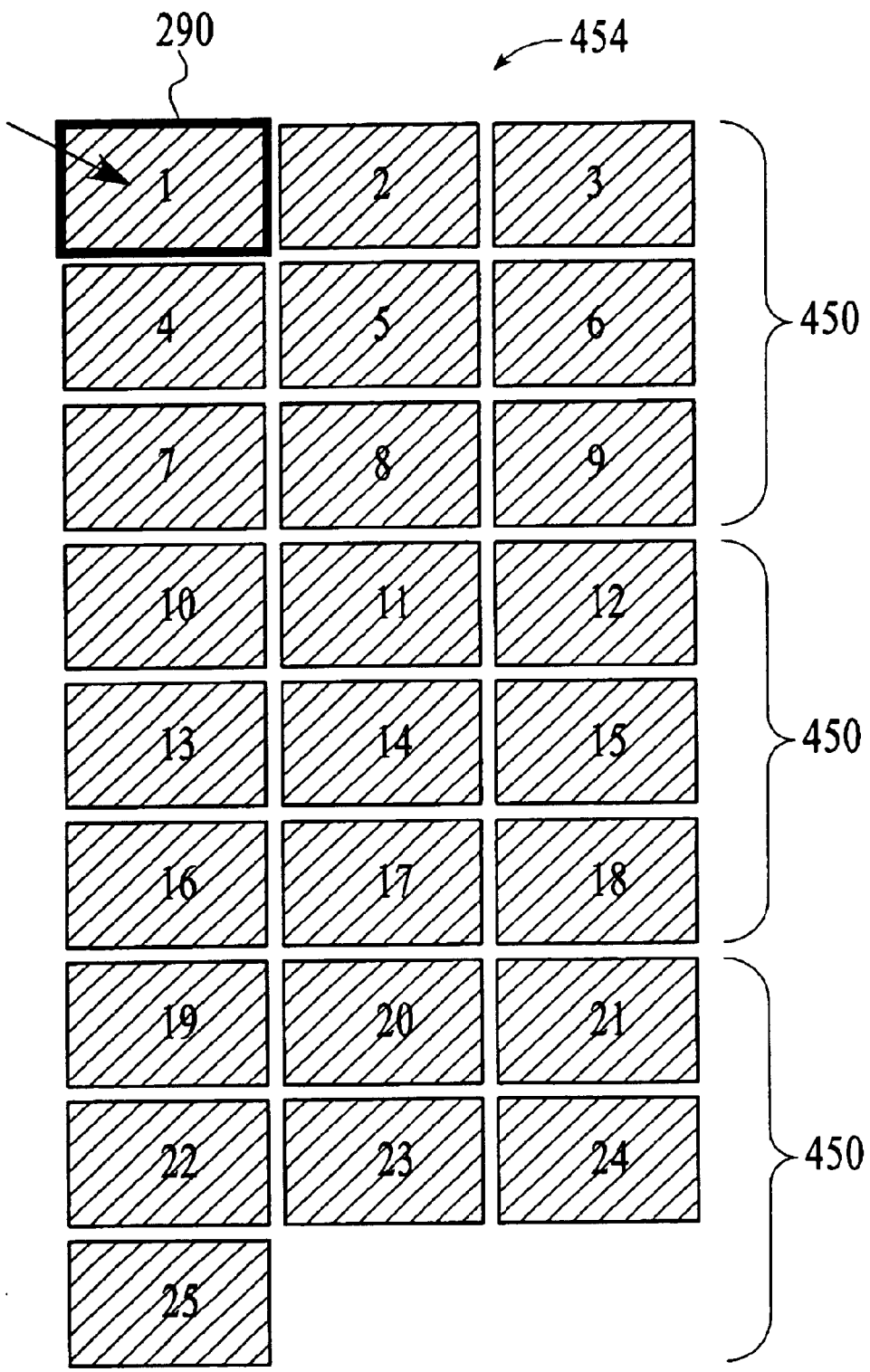
FIG. 9 is a block diagram showing a plurality of pages of images.

Referring now to FIG. 9, what is shown is a plurality of pages 450 of images. In a preferred embodiment, the user can navigate through and select a different thumbnail 454 within a particular page by means of the four-way navigation button 271. The selected thumbnail is highlighted by the highlight area 290. As the user depresses the navigation button 271 (FIG. 8) up, down, left, and right, the highlighted area is moved around the thumbnails in a displayed page 450, or between pages 450, depending on the location of the highlight area and the particular button pressed on the four-way navigation button 271, as described below.

Figure 10:
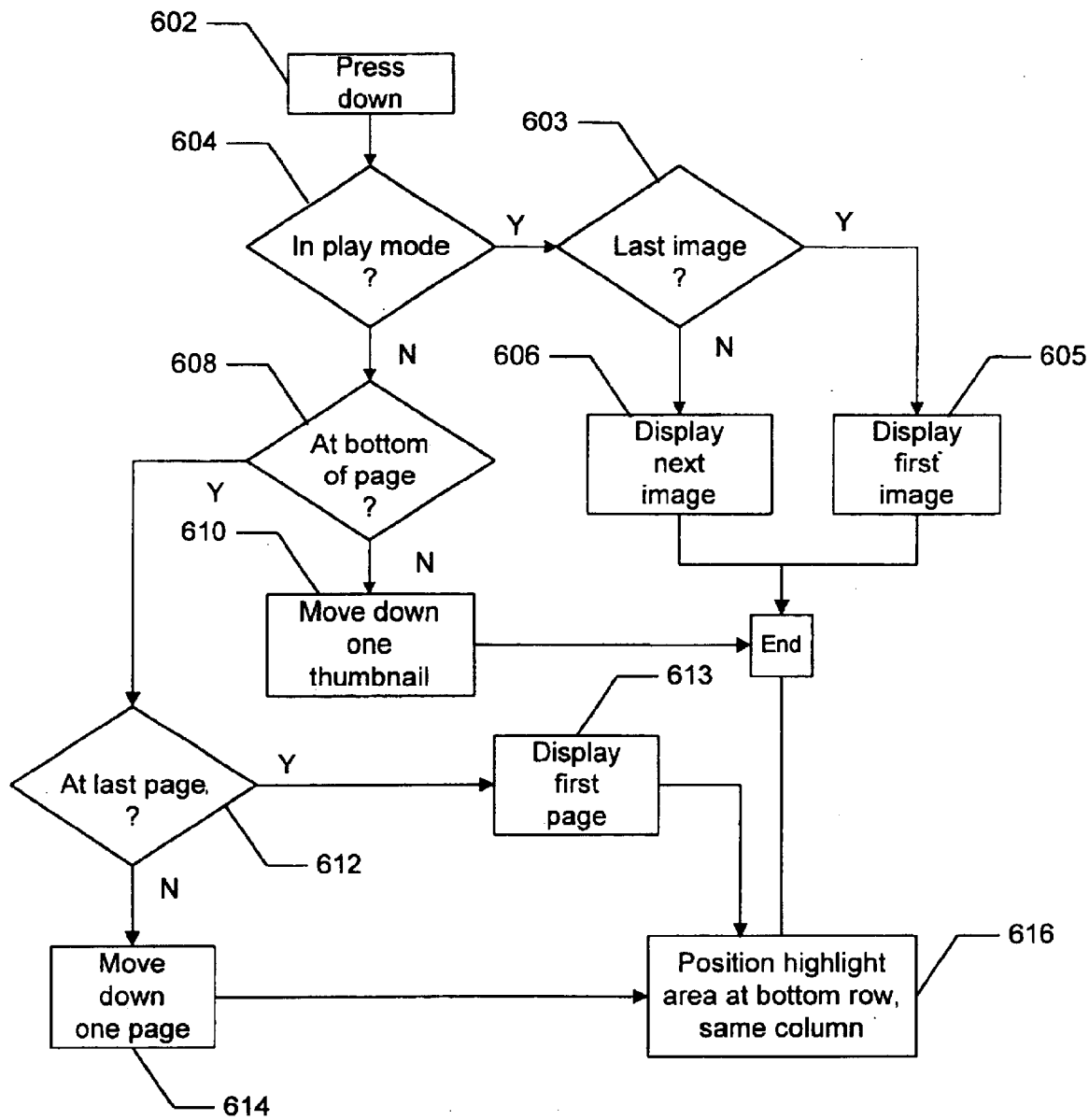
FIG. 10 is a flow chart showing movement by pressing the down button.

FIG. 10 is a flow chart showing the movement by pressing the down button. Accordingly, when the down button is pressed via step 602, first it must be determined if the capture unit is in play mode, via step 604. Recall that in play mode only one screen-sized image is displayed on the screen. If it is in the play mode then it must be determined if this is the last image, via step 603. If it is the last image, then display the first image, via step 605. If it is not the last image then display the next image, via step 606.

If it is not in the play mode then it must be determined if the highlight area is at the bottom of the page, via step 608. If the highlight area is not at the bottom of the page then it will move down one thumbnail, via step 610. If the highlight area is at the bottom of the page, then it must be determined if this is the last page, via step 612. If it is the last page, then display the first page, via step 613. If it is not the last page then the highlight area will move down one page, via step 614 and be positioned at the bottom row in the same column. As the original position of the highlight area, via step 616. Thereafter a single press of the down button 268 allows for scrolling downwardly a page at a time. Note that this naturally extends the function, which is, the function is still a down function that is easily and naturally understood by the user. The purpose of step 616 is to allow a single down keystroke to move the highlighted area down a page at a time, once page mode is initiated.

Figure 11:
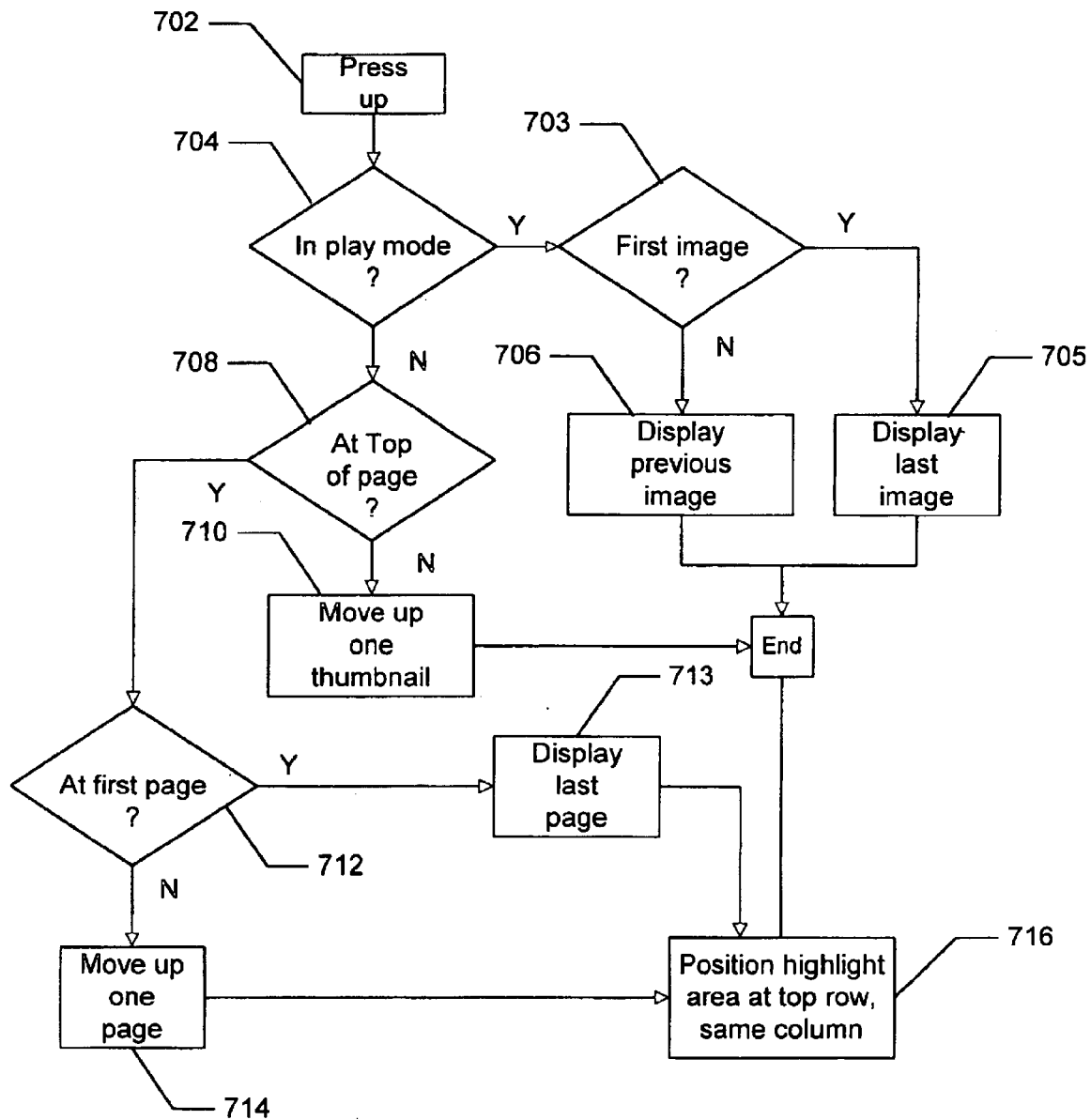
FIG. 11 is a flow chart showing the movement by pressing the up button.

FIG. 11 is a flow chart showing the movement by pressing the up button. Accordingly, when the up button is pressed via step 702, first it must be determined if the capture unit is in play mode, via step 704. If it is in play mode, then it must be determined if this is the first thumbnail, via step 703. If it is the first thumbnail, then display the last thumbnail, via step 705. If it is not the first thumbnail, then display the previous thumbnail, via step 706.

If it is not in the play mode then it must be determined if the highlight area is at the top of the page, via step 708. If the highlight area is not at the top of the page then it will move up one thumbnail, via step 710. If the highlight area is at the top of the page, then it must be determined if this is the first page, via step 712. If it is the first page, then display the last page, via step 713. If it is not at the first page then the highlight area will move up one page, via step 714, and be positioned in the top row in the same column as the original position of the highlight area, via step 716. Thereafter a single press of the up button 268 allows for scrolling upwardly a page at a time. Note that this naturally extends the function, that is it still is an up function that is easily and naturally understood by the user. The purpose of step 716 is to allow a single up keystroke to move the highlighted area up a page at a time, once page mode is initiated.

Figure 12:
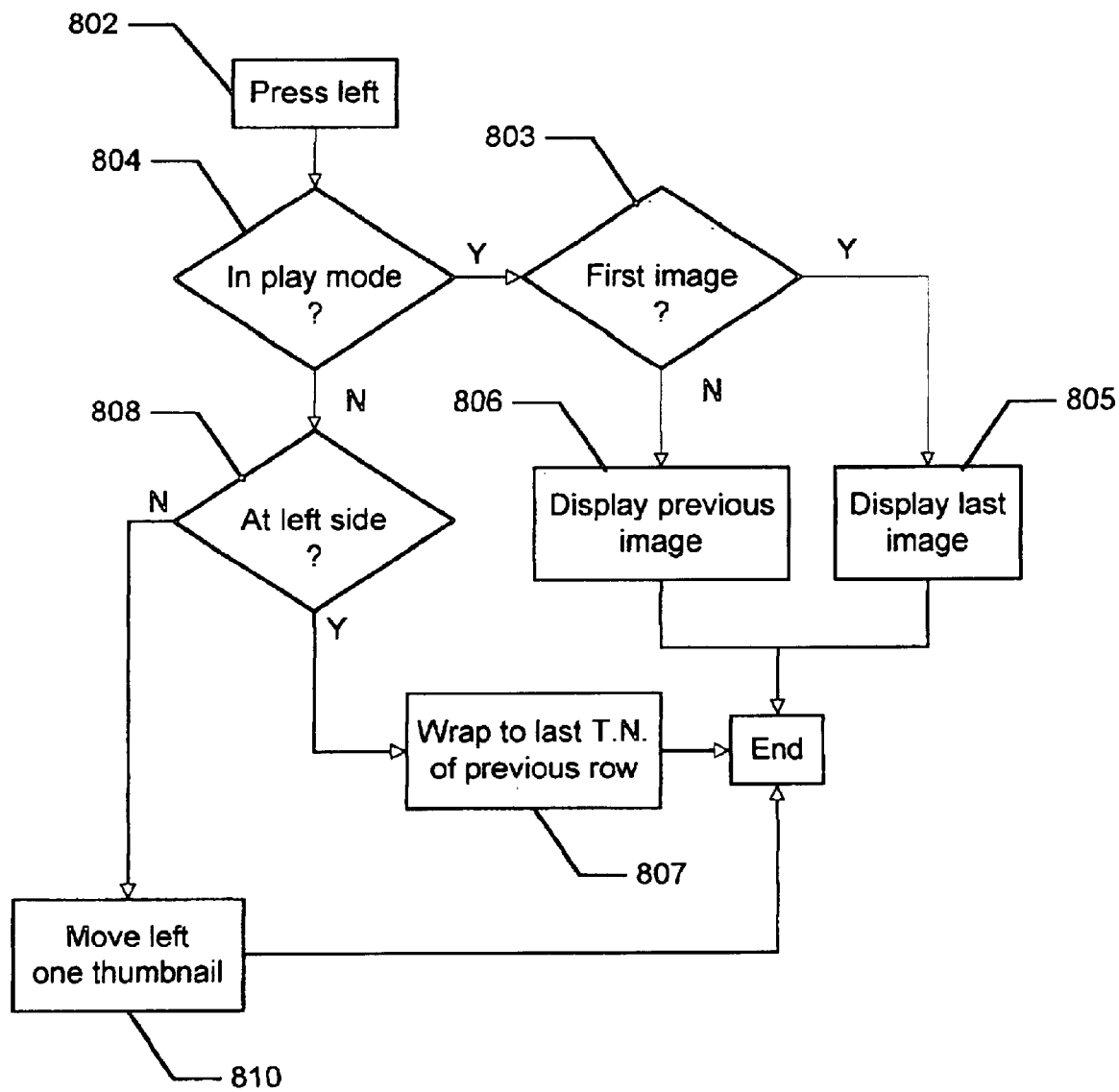
FIG. 12 is a flow chart showing the movement by depressing the left button.

FIG. 12 is a flow chart showing the movement by depressing the left button. Accordingly, when the left button is pressed via step 802, first it must be determined if the capture unit is in the play mode, via step 804. If it is in the play mode then it must be determined if this is the first thumbnail, via step 803. If it is the first thumbnail, then display the last thumbnail, via step 805. If it is not the first thumbnail, then display the previous thumbnail via step 806. If the image capture unit is not in the play mode, then it must be determined if the highlight area is at the left side of the page, via step 808. If it is at the left side, then the highlight area will wrap to the last thumbnail of the previous row, via step 807. Preferably, if the previous row is on the previous page, then the display pages up. However, if the highlight area is not at the left hand side, then the highlight area will move one thumbnail to the left, via step 810.

Figure 13:
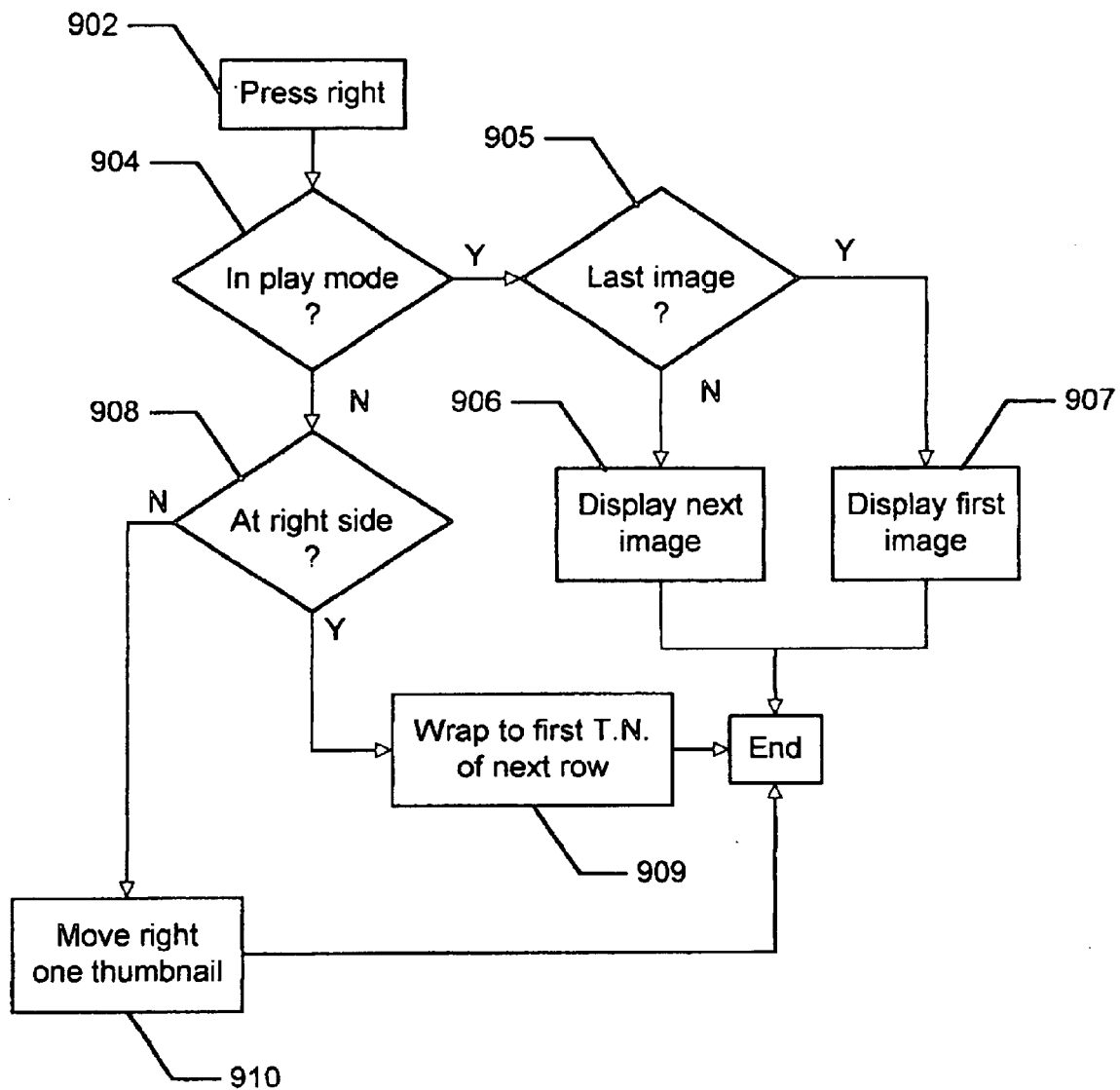
FIG. 13 is a flow chart showing the movement by depressing the right button.

FIG. 13 is a flow chart showing the movement by depressing the right button. Accordingly, when the right button is pressed via step 902, first it must be determined if the capture unit is in the play mode, via step 904. If it is in the play mode then it must be determined if this is the last thumbnail, via step 905. If it is the last thumbnail, then display the first thumbnail, via step 907. If it is not the last thumbnail then display the next thumbnail.

If the image capture unit is not in the play mode, then it must be determined if the highlight area is at the right side of the page, via step 908. If it is at the right side, then the highlight area wraps the first thumbnail of the next row, via step 909. Preferably, if the next row is on the next page, then a page down is performed. However, if the highlight area is not at the right side, then the highlight area will move one thumbnail to the right, via step 910.

Figure 14:
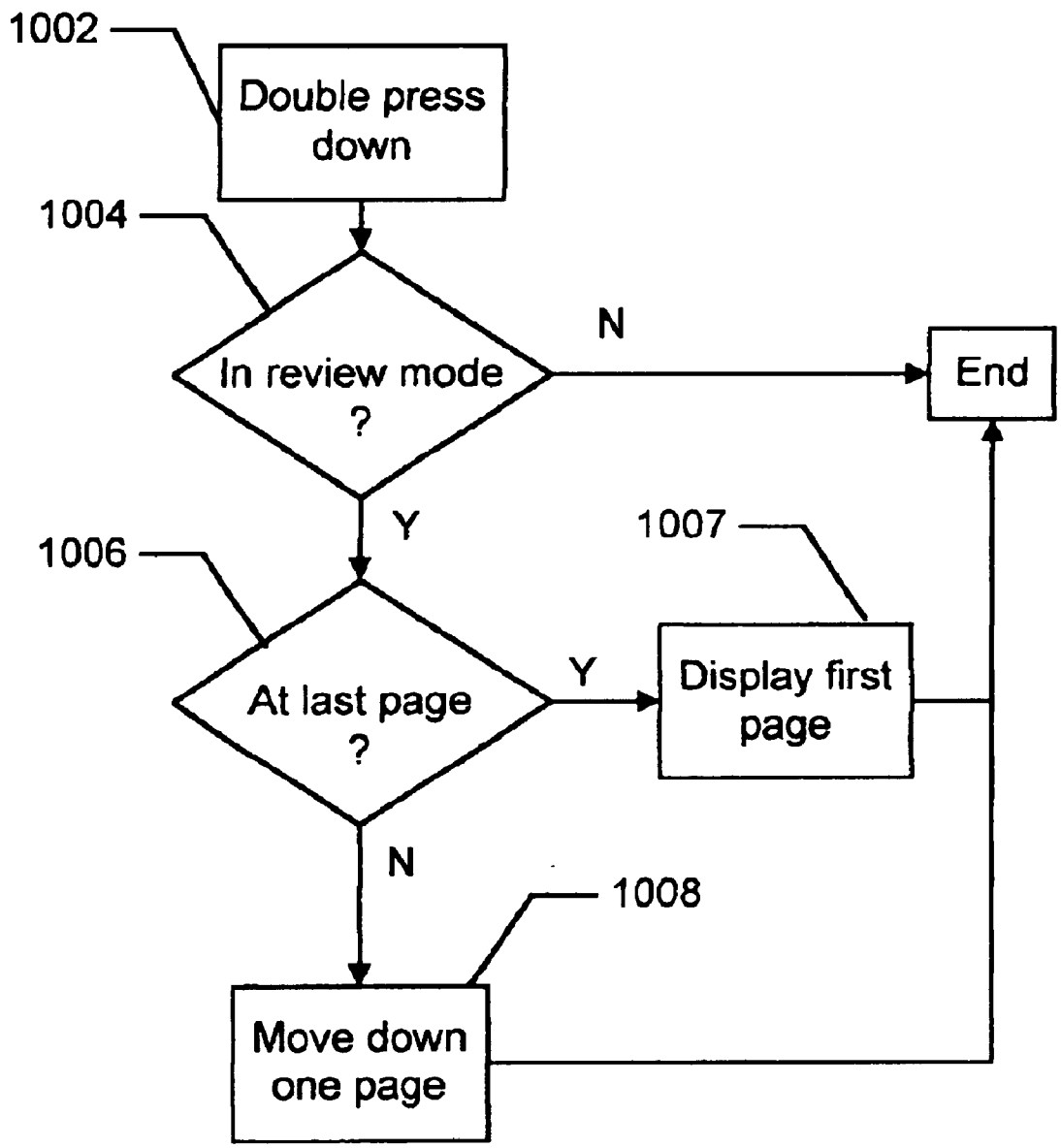
FIG. 14 is a flow chart showing the movement by double pressing the down button.

FIG. 14 is a flow chart showing the movement by double pressing the down button. Providing a double press-interaction acts as "shortcut" mechanism that allows the user to enter page mode directly from any position on the page. According to another aspect of the present invention, if the down button is double pressed, via step 1002, first it must be determined if the capture unit is in review mode, via step 1004. If it is not in review mode, then end. If it is in review mode then it must be determined whether the highlight area is at a last page via step 1006. If it is not at a last page then move down one page, via step 1008. If the highlight area is at the last page, the display the first page, via step 1007.

Figure 15:
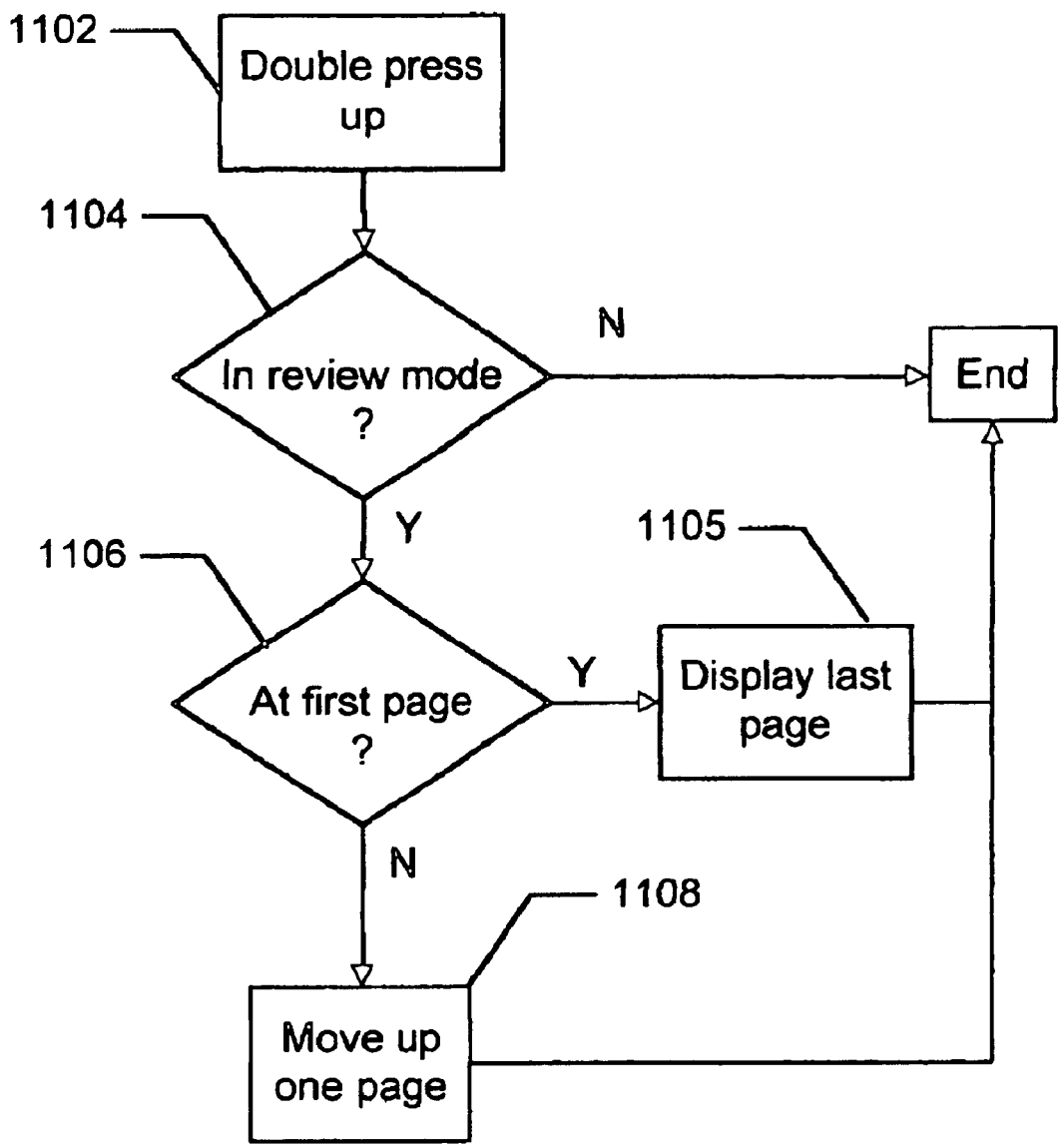
FIG. 15 is a flow chart showing the movement by double pressing the up button.

FIG. 15 is a flow chart showing the movement by double pressing the up button. Accordingly if the up button is double pressed, via step 1102, first it must be determined if the capture unit is in review mode, via step 1104. If it is not in review mode, then end. If it is in review mode then it must be determined whether the highlight area is at a first page, via step 1106. If it is at a first page, then display the last page, via step 1105. If it is not at a first page then move up one page, via step 1108. This is a similar shortcut as described earlier.

In another embodiment, a triple press of the down button 268 moves the highlight area 290 to the last page and last image, and a triple press of the up button 266 moves the highlight area 290 to the first page and first image. Alternately, a double press of the left or right button could produce the same result.

A preferred embodiment of the present invention has been described in terms of a vertical navigation method whereby the memory bar 276 includes vertically aligned pages is displayed along a vertical edge of the display and the user navigates between pages with vertical navigation buttons. In a second preferred embodiment, the present invention could also be implemented with a horizontal navigation method whereby the memory bar 276 includes horizontally aligned pages is displayed along a horizontal edge of the display and the user navigates between pages with horizontal navigation buttons.

The present invention provides for a more natural review and navigation system for an image capture device which facilitates faster review of images and provides a detailed graphical view of the relative location of thumbnails and pages within memory. By providing a more natural review interaction and a detailed thumbnail memory bar 276, a user can more easily understand how to navigate through images. The method for reviewing and navigating among images and pages displayed on an image capture device is more natural, efficient and straightforward than previously known systems b. In each of the display modes, the keys have only one function, which remains consistent, and the thumbnail memory bar 276 also scales to the layout of the display mode, providing a consistent view of the memory contents. This system facilitates ease in navigating through and reviewing images and is advantageous over known conventional techniques.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

What is claimed is:

1. A method for reviewing and navigating among stored images on an image capture unit having a display, wherein each of the stored images is represented by a thumbnail image, the method comprising the steps of:

(a) displaying a page of thumbnail images on a display in which when the page is full of thumbnails, all the thumbnails are arranged in an N×M array;

(b) displaying a memory bar adjacent to the page on the display, wherein the memory bar indicates a position of the displayed page in relation to the other pages of stored images;

(c) allowing the user to navigate among the thumbnail images in the displayed page via the up, down, right and left buttons, where a highlight area indicates a location of a currently selected thumbnail;

(d) allowing the user to navigate from the displayed page to other pages via up, down, right and left buttons, wherein the displayed page is replaced with a second page; and (e) updating the memory bar to indicate a position of the second page in relation to the other pages.

2. The method of claim 1 wherein step (c) further includes the step of:

(i) on the memory bar, indicating the location of the currently selected thumbnail within the displayed page.

3. The method of claim 2 wherein step (b) further includes the step of:

(i) providing the memory bar with a series of min-pages representing pages, where each mini-page includes an N×M array of graphical elements representing thumbnail positions.

4. The method of claim 3 wherein step (e) further includes the step of:

(i) performing one or more operations on the selected thumbnail, including playing the image, deleting the image, editing the image, and displaying information about the image.

5. The method of claim 4 wherein step (c) further includes the steps of:

(ii) allowing the user navigate one thumbnail at a time with one press of the buttons.

6. The method of claim 5 wherein step (b) further includes the step of:

(ii) displaying the memory bar along a vertical edge of the display and displaying vertically aligned min-pages, whereby the user navigates between the pages with vertical navigation buttons.

7. The method of claim 6 wherein step (d) further includes the step of:

(i) allowing the user to navigate one page at a time with a double press of either the up or down buttons.

8. The method of claim 7 wherein step (d) further includes the step of:

(ii) allowing the user to navigate to first page from any other page with a triple press of the up button; and (iii) allowing the user to navigate to a last page from any other page with a triple press of the down button.

9. The method of claim 5 wherein step (b) further includes the step of:

(ii) displaying the memory bar along a horizontal edge of the display and displaying horizontally aligned min-pages, whereby the user navigates between the pages with horizontal navigation buttons.

10. A computer readable medium containing program instructions for reviewing and navigating among stored images on an image capture unit having a display, wherein each of the stored images is represented by a thumbnail image, the program instructions for:

(a) displaying a page of thumbnail images on a display in which when the page is full of thumbnails, all the thumbnails are arranged in an N×M array;

(b) displaying a memory bar adjacent to the page on the display, wherein the memory bar indicates a position of the displayed page in relation to the other pages of stored images;

(c) allowing the user to navigate among the thumbnail images in the displayed page via the up, down, right and left buttons, where a highlight area indicates a location of a currently selected thumbnail;

(d) allowing the user to navigate from the displayed page to other pages via up, down, right and left buttons, wherein the displayed page is replaced with a second page; and (e) updating the memory bar to indicate a position of the second page in relation to the other pages.

11. The computer readable medium of claim 10 wherein instruction (c) further includes the instruction of:

(i) on the memory bar, indicating the location of the currently selected thumbnail within the displayed page.

12. The computer readable medium of claim 11 wherein instruction (b) further includes the instruction of:

(i) providing the memory bar with a series of min-pages representing pages, where each mini-page includes an N×M array of graphical elements representing thumbnail positions.

13. The computer readable medium of claim 12 wherein instruction (e) further includes the instruction of:

(i) performing one or more operations on the selected thumbnail, including playing the image, deleting the image, editing the image, and displaying information about the image.

14. The computer readable medium of claim 13 wherein instruction (c) further includes the instruction of:

(ii) allowing the user navigate one thumbnail at a time with one press of the buttons.

15. The computer readable medium of claim 14 wherein instruction (b) further includes the instruction of:

(ii) displaying the memory bar along a vertical edge of the display and displaying vertically aligned min-pages, whereby the user navigates between the pages with vertical navigation buttons.

16. The computer readable medium of claim 15 wherein instruction (d) further includes the instruction of:

(i) allowing the user to navigate one page a time with a double press of either the up or down buttons.

17. The computer readable medium of claim 16 wherein instruction (d) further includes the instruction of:

(ii) allowing the user to navigate to first page from any other page with a triple press of the up button; and (iii) allowing the user to navigate to a last page from any other page with a triple press of the down button.

18. The computer readable medium of claim 14 wherein instruction (b) further includes the instruction of:

(ii) displaying the memory bar along a horizontal edge of the display and displaying horizontally aligned min-pages, whereby the user navigates between the pages with horizontal navigation buttons.

19. A image capture unit comprising:

a memory for storing digital images, wherein each of the digital images is represented by a thumbnail;

a four-way navigation control having left, right, up, and down buttons;

a display; and a processor for controlling operation of the image capture unit by:

displaying a page of thumbnail images on the display for review by a user, wherein when the page is full of thumbnails, all the thumbnails are arranged in an N×M array, displaying a memory bar adjacent to the page on the display, wherein the memory bar indicates a position of the displayed page in relation to the other pages of stored images, highlighting a location of a currently selected thumbnail on the displayed page in response to the user pressing the up, down, right and left buttons to navigate among the thumbnail images, on the memory bar, indicating the location of the currently selected thumbnail within the displayed page;

in response to the user navigating from the displayed page to other pages via up, down, right and left buttons, replacing the displayed page with a second page, and updating the memory bar to indicate a position of the second page in relation to the other pages.

20. The image capture unit of claim 19 wherein the memory bar includes a series of min-pages representing pages, where each mini-page includes an N×M array of graphical elements representing thumbnail positions.

21. The image capture unit of claim 20 wherein in response to input by the user, the processor performs one or more operations on the selected thumbnail, including playing the image, deleting the image, editing the image, and displaying information about the image.

22. The image capture unit of claim 20 wherein the user is allowed to navigate one thumbnail at a time with one press of the buttons.

23. The image capture unit of claim 22 wherein the memory bar is displayed along a vertical edge of the display and displaying vertically aligned min-pages, whereby the user navigates between the pages with vertical navigation buttons.

24. The image capture unit of claim 23 wherein the user is allowed to navigate one page at a time with a double press of either the up or down buttons.

25. The image capture unit of claim 24 wherein the user is allowed to navigate to first page from any other page with a triple press of the up button and to navigate to a last page from any other page with a triple press of the down button.

26. The image capture unit of claim 22 wherein the memory bar is displayed along a horizontal edge of the display and displaying horizontally aligned min-pages, whereby the user navigates between the pages with horizontal navigation buttons.

27. A method for reviewing and navigating among stored images on an image capture unit having a display, wherein each of the stored images is represented by a thumbnail image, the method comprising the steps of:

(a) displaying a page of a sequence of pages, wherein each of the pages is capable of displaying an array of N×M images;

(b) allowing a user to navigate among images within the displayed page and to navigate between pages;

(c) highlighting each image on the page as a user navigates among the images within the displayed page, wherein the highlighted image is a currently selected image;

(d) displaying a memory bar adjacent to an edge of the display, wherein the memory bar functions to indicate a position of the displayed page in relation to other pages, and to indicate the position of the currently selected image within the displayed page by, (i) displaying a series of mini-pages representing the pages, where each mini-page includes an N×M array of elements representing image positions within the corresponding page, (ii) highlighting the mini-page in the memory bar corresponding to the displayed page as the user navigates from page to page, and (iii) highlighting the element within the mini-page corresponding to the currently selected image within the displayed page.

28. The method of claim 27 wherein step (a) further includes the step of:

(i) displaying the images as thumbnail images.

29. The method of claim 28 wherein step (a) further includes the step of:

(ii) allowing the user to choose different display formats for the pages.

30. The method of claim 29 wherein step (b) further includes thee step of:

(i) providing an Navigation button having a left, right, up, and down buttons.

31. The method of claim 30 wherein step (c) further includes the step of:

(i) allowing the user navigate one thumbnail at a time with one press of the navigation buttons.

32. The method of claim 31 wherein step (d) further includes the step of:

(i) displaying the memory bar along a vertical edge of the display and displaying vertically aligned min-pages, whereby the user navigates between the pages with vertical navigation buttons.

33. The method of claim 32 wherein step (c) further includes the step of:

(ii) allowing the user to navigate one page at a time with a double press of either the up or down buttons.

34. The method of claim 33 wherein step (c) further includes the step of:

(iv) allowing the user to navigate to first page from any other page with a triple press of the up button; and (v) allowing the user to navigate to a last page from any other page with a triple press of the down button.

35. The method of claim 34 wherein step (d) further includes the step of:

(ii) displaying the memory bar along a horizontal edge of the display and displaying horizontally aligned min-pages, whereby the user navigates between the pages with horizontal navigation buttons.

* * * * *